(12) United States Patent
Auber

(10) Patent No.: US 8,961,102 B2
(45) Date of Patent: Feb. 24, 2015

(54) SHAFT SEALING SYSTEM AND METHOD WITH SEAL OIL RECUPERATOR SYSTEM

(75) Inventor: Philippe Auber, Le Havre (FR)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/123,789

(22) PCT Filed: Jun. 6, 2012

(86) PCT No.: PCT/US2012/040971
§ 371 (c)(1),
(2), (4) Date: Jul. 3, 2014

(87) PCT Pub. No.: WO2012/170453
PCT Pub. Date: Dec. 13, 2012

(65) Prior Publication Data
US 2014/0314545 A1  Oct. 23, 2014

Related U.S. Application Data

(66) Substitute for application No. 61/493,771, filed on Jun. 6, 2011.

(51) Int. Cl.
*F04D 29/12* (2006.01)
*F16J 15/24* (2006.01)

(52) U.S. Cl.
CPC .............. *F04D 29/124* (2013.01); *F16J 15/24* (2013.01)
USPC .............. 415/1; 415/104; 415/112; 415/113; 415/169.1; 415/169.2; 415/176; 415/230; 415/231; 277/422; 277/429; 277/430; 277/431; 277/432

(58) Field of Classification Search
USPC ...................... 415/1, 104, 105, 109, 111–113, 415/175–176, 180, 230–231, 169.1, 169.2; 416/1, 174; 277/422, 429, 430, 431, 277/432
See application file for complete search history.

(56) References Cited

U.S. PATENT DOCUMENTS

| 3,937,022 | A | | 2/1976 | Swearingen | |
|---|---|---|---|---|---|
| 4,477,223 | A | * | 10/1984 | Giroux | ....................... 415/168.2 |
| 4,621,981 | A | | 11/1986 | Lorett | |
| 6,398,484 | B1 | * | 6/2002 | Orikasa et al. | ................ 415/112 |
| 6,582,185 | B2 | | 6/2003 | Lippert et al. | |
| 6,663,341 | B2 | | 12/2003 | Evans et al. | |

FOREIGN PATENT DOCUMENTS

EP  1063430 A1  12/2000

OTHER PUBLICATIONS

PCT/US2012/040971—International Search Report and Written Opinion mailed Jan. 29, 2013 (10 pages).

* cited by examiner

*Primary Examiner* — Christopher Verdier
(74) *Attorney, Agent, or Firm* — Edmonds & Nolte, PC

(57) ABSTRACT

A system and method for sealing a shaft disposed for rotation within a casing, where two axially-spaced seal rings of an oil film seal extend around the shaft and define a clearance therebetween. Oil is pumped into the clearance from an oil reservoir and a portion of the oil is received in an annular port defined in the casing between an outer labyrinth seal and one of the axially-spaced seal rings. The oil mixes with a process gas to for an oil and gas mixture. A blower is in fluid communication with the annular port and circulates the oil and gas mixture to a trap where the oil is separated from the process gas and a separated process gas is returned back to the annular port.

20 Claims, 4 Drawing Sheets

SHAFT SEALING SYSTEM AND METHOD WITH SEAL OIL RECUPERATOR SYSTEM

The present application is a national stage application of PCT Pat. App. No. PCT/US2012/040971, filed Jun. 6, 2012, which claims priority to U.S. Patent Application Ser. No. 61/493,771, which was filed Jun. 6, 2011. These priority applications are hereby incorporated by reference in their entirety into the present application, to the extent that these priority applications are not inconsistent with the present application.

BACKGROUND

Shaft seals for rotating machines, such as the rotor of a centrifugal compressor, present several design challenges. For example, the seal oil used in oil film seals has a tendency to migrate to the interior of the machine and contaminate the working fluid. Also, in the case of a compressor, the working fluid to be compressed often escapes into the seal, thereby wasting valuable product and achieving loss of performance.

Since both of these problems typically reduce the efficiency of the rotating machinery, they are continuously addressed and improved upon. Remedial techniques include venting or piping the leaked oil and/or gas to a low pressure point where it can be either used in a lower-pressure machine or flared to the environment. Both of these techniques, however, can result in relatively large losses of oil and a rather high degree of pollution emitted into the atmosphere.

What is needed, therefore, is a shaft seal system that eliminates the need to vent leaked oil and/or gas to a low-pressure point or flare the leaked fluids into the environment.

SUMMARY

Embodiments of the disclosure may provide a shaft sealing system for a rotating machine. The shaft sealing system may include an outer seal ring axially-spaced from an inner seal ring along a shaft arranged for rotation in a casing of the rotating machine, the outer and inner seal rings being radially-offset from an outer surface of the shaft to define a clearance between the seals and the shaft. The shaft sealing system may also include an oil reservoir and a pump configured to introduce oil from the oil reservoir to the clearance, and an annular port defined in the casing between the inner seal ring and an outer labyrinth seal, the annular port being adapted to receive a portion of the oil introduced to the clearance, which mixes with process gas to generate an oil and gas mixture. The shaft sealing system may further include a blower configured to circulate the oil and gas mixture from the annular port to a trap, and return a separated process gas back to the annular port.

Embodiments of the disclosure may further provide a method for sealing a rotatable shaft in a rotating machine. The method may include introducing oil into a clearance defined between an outer surface of the rotatable shaft and outer and inner seal rings arranged within a casing of the rotating machine, the outer and inner seal rings being axially-spaced from each other along the rotatable shaft. The method may also include receiving a portion of the oil introduced to the clearance at an annular port defined in the casing between the inner seal ring and an outer labyrinth seal axially-spaced from the inner seal ring, wherein the portion of the oil introduced to the clearance mixes with process gas to generate an oil and gas mixture. The method may further include circulating the oil and gas mixture with a blower from the annular port to a trap, and returning a separated process gas back to the annular port.

Embodiments of the disclosure may further provide a compressor. The compressor may include a rotatable shaft arranged for rotation within a casing, an oil film seal arranged about the rotatable shaft and radially-offset from an outer surface of the rotatable shaft to define a clearance between the seal and the rotatable shaft, and an oil reservoir and a pump in fluid communication with the clearance, the pump being configured to provide oil to the clearance, wherein a first portion of the oil introduced into the clearance is received within a chamber that is axially-adjacent a first side of the oil film seal. The compressor may further include an annular port defined in the casing between the oil film seal and an outer labyrinth seal, the annular port receiving a second portion of the oil introduced to the clearance, wherein the second portion mixes with a process gas to generate an oil and gas mixture, and a blower in fluid communication with the annular port and configured to draw the oil and gas mixture from the annular port and return a separated process gas back to the annular port. The compressor may also include a trap fluidly coupled to the annular port and blower the trap being configured to receive the oil and gas mixture and separate the oil from the process gas, wherein the oil separated from the process gas is recycled to the oil reservoir and the process gas separated from the oil is the separated process gas.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
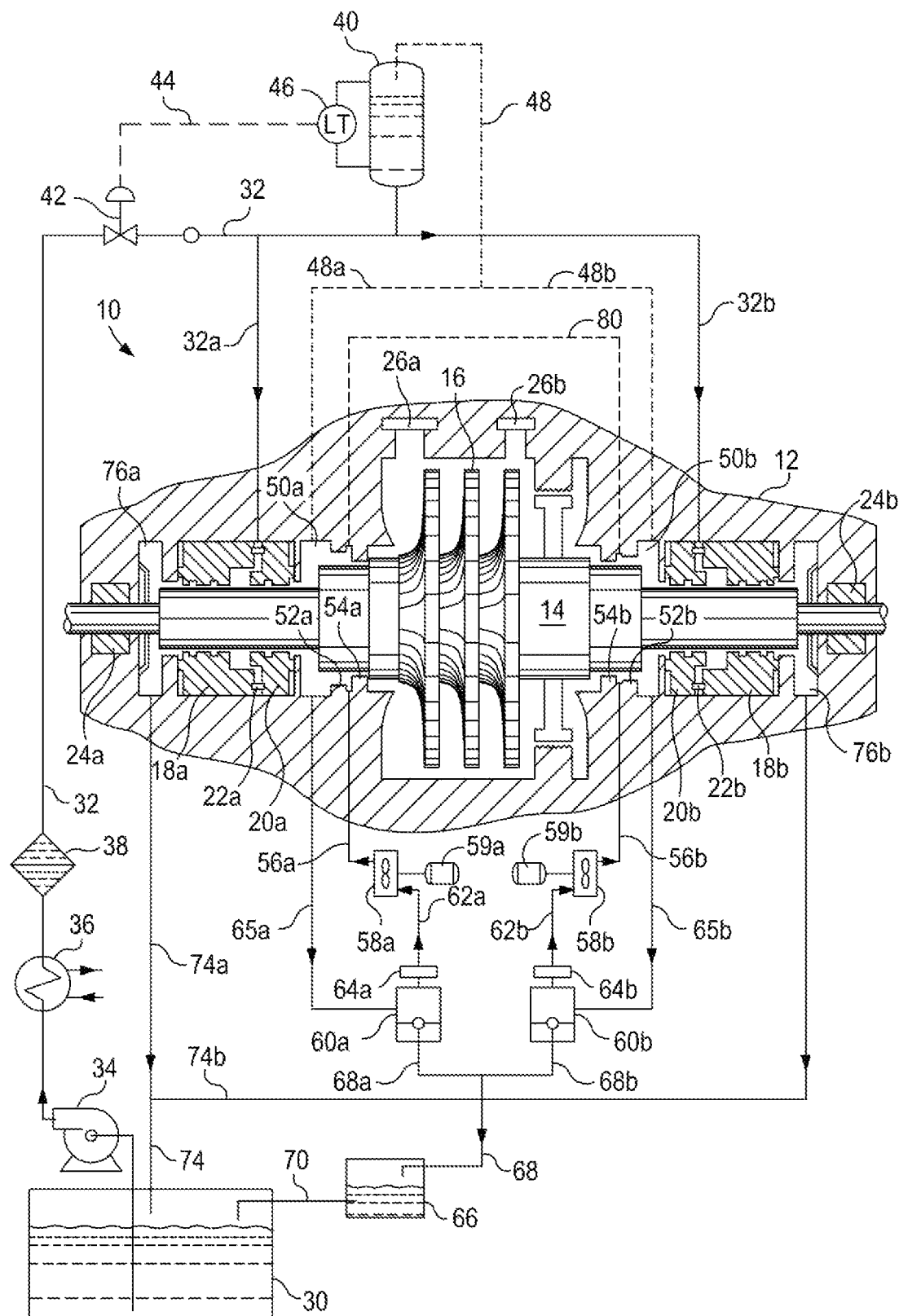
FIG. 1 is a partial cross-sectional, partial diagrammatic view of an embodiment of the disclosure according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Referring to FIG. 1, illustrated is a partial cross-sectional, partial diagrammatic view of a rotating machine 10 that has a casing 12 for housing several components to be described herein. In one embodiment, the rotating machine 10 may be a turbomachine, such as a centrifugal compressor. A rotor is supported in the casing 12 and includes a stepped-diameter shaft 14 having one or more (in this case three) impellers 16 mounted to the shaft 14 near a central portion thereof.

Two outer seal rings 18a and 18b are supported in the casing 12 and extend circumferentially around the shaft 14. Two inner seal rings 20a and 20b are also supported in the casing 12 and also extend circumferentially around the respective portions of the shaft 14. In at least one embodiment, the combination of each pair of inner and outer seal rings (e.g., 18a, 20a, and 18b, 20b) may form oil film seals, respectively, disposed on opposing ends of the shaft 14. As illustrated, the outer seal ring 18a is connected to the inner seal ring 20a by one or more springs 22a, and the outer seal ring 18b is connected to the inner seal ring 20b by one or more springs 22b.

Each end of the shaft 14 extends through a bearings or bushings 24a and 24b, respectively, and may project out from the casing 12. It is understood that a prime mover, for example, an electric motor, turbine or the like (not shown), may be coupled to one or both of the ends of the shaft 14 and configured to drive the shaft 14 into rotational movement, thereby rotating the impellers 16 for fluid compression. A fluid inlet 26a and a fluid outlet 26b are formed in the casing 12 and the interior of the casing 12 is configured such that the working fluid to be compressed is introduced into the inlet 26a, compressed by the one or more series or stages of impellers 16, and eventually discharged from the casing 12 via the outlet 26b.

An oil reservoir 30 containing sealing or lubricating oil is connected to a supply pipe or conduit 32 that feeds the oil to the rotating machine 10. A pump 34 is arranged in the conduit 32 to pump the oil from the reservoir 30 and through the conduit 32. In at least one embodiment, a cooler 36 and a filter 38 may also be included in the conduit 32 to cool and filter impurities from the oil, respectively. As illustrated, the conduit 32 is divided into two branch conduits 32a and 32b which extend into the area defined between the seal rings 18a and 20a and the area defined between the seal rings 18b and 20b, respectively. Accordingly, when the pump 34 is actuated or engaged, oil is pumped from the reservoir 30 into each oil film seal, or the areas formed between the rings 18a, 20a and 18b, 20b, and the adjacent portions of the shaft 14 for sealing and lubrication.

A tank 40 or other holding reservoir may also be fluidly coupled to the rotating machine 10. The tank 40 may also be fluidly coupled to the oil supply conduit 32 via a normally-closed control valve 42 and a conduit 44 that fluidly connects the valve 42 and the tank 40. In one embodiment, the tank 40 may be adapted to store oil to maintain an overpressure of oil in the rotating machine 10. To accomplish this, a level transmitter (LT) 46 is provided and adapted to sense the level of the oil in the tank 40 and, when the oil level falls below a predetermined value, it opens the valve 42 to permit oil to flow from conduit 32, through conduit 44, and ultimately into the tank 40 until an appropriate pressurizing level in the tank 40 is achieved.

A conduit 48 places the tank 40 in fluid communication with the rotating machine 10. The conduit 48 may extend from the upper portion of the tank 40 and is divided into two branch conduits 48a and 48b which fluidly communicate with the upper portion of annular ports 50a and 50b, respectively, which are defined or otherwise formed within the casing 12 axially-adjacent the inner rings 20a and 20b, respectively. In operation, the conduit 48 maintains the tank 40 in a pressurized state by referencing the tank 40 to the high pressures existing in the annular ports 50a and 50b.

A pair of outer labyrinth seals 52a and 52b is provided in the casing 12 and form at least a portion of one of the walls defining the ports 50a and 50b. A pair of inner labyrinth seals 54a and 54b may be disposed axially-adjacent the outer labyrinth seals 52a and 52b, respectively, toward the impellers 16. It will be appreciated, however, that each pair of inner and outer labyrinth seals (e.g., 52a, 54a, and 52b, 54b) may include one-piece labyrinth seals. Also, while the outer labyrinth seals 52a and 54a are illustrated as being radially-offset from the shaft 14 by a larger distance than the radial-offset of the inner labyrinth seals 52b and 54b, it will be appreciated that the radial-offsets of each may vary or be equal, without departing from the scope of the disclosure.

A first conduit 56a extends from between the labyrinth seals 52a and 54a and fluidly communicates with a first blower 58a. A second conduit 56b extends from between the labyrinth seals 52b and 54b and fluidly communicates with a second blower 58b. In one or more embodiments, the first and second blowers 58a and 58b are motor-driven hyperbaric fans. In at least one embodiment, motors 59a and 59b power or otherwise drive the blowers 58a and 58b, respectively, and may each be a micro expander that uses a portion of the process gas. However, it will be appreciated that any type of suitable motor, such as an electric motor, may be employed without departing from the scope of the invention.

The first blower 58a fluidly communicates with a first trap 60a via a first trap vent conduit 62a, and the second blower 58b fluidly communicates with a second trap 60b via a second trap vent conduit 62b. Demisters 64a and 64b may be arranged in the first and second trap vent conduits 62a and 62b, respectively. A first port conduit 65a extends from the port 50a to the first trap 60a, and a second port conduit 65b extends from the port 50b to the second trap 60b.

When actuated, the first blower 58a draws a mixture of gas and oil (e.g., sour oil) from the port 50a via the first port conduit 65a and into the first trap 60a. The first trap 60a may be configured to substantially separate the gas from the oil and channel the separated gas through the first trap vent conduit 62a, the first conduit 56a, and ultimately back into the port 50a in the area defined between the labyrinth seals 52a and 54a. Likewise, when actuated, the second blower 58b draws sour oil from the port 50b via the second port conduit 65b and into the second trap 60b where the gas and oil are substantially separated. The separated gas is channeled through the second trap vent conduit 62b, the second conduit 56b, and ultimately back to the port 50b in the area defined between the labyrinth seals 52b and 54b. The demisters 64a and 64b arranged in the first and second trap vent conduits 62a and 62b, respectively, may be adapted to transform any mist or humid gas in the separated gas into droplets that may be removed and generate a more dry separated gas flow.

The oil separated from the gas in the first and second traps 60a and 60b may be directed to a degassing tank 66 that is fluidly coupled to the first and second traps 60a and 60b via two branch conduits 68a and 68b that are joined into drain conduit 68. Another conduit 70 connects the degassing tank 66 to the oil reservoir 30, thus, oil derived from the traps 60a and 60b can be returned to the oil reservoir 30 for conditioning and recirculation into the rotating machine 10.

An oil drain conduit 74 also fluidly communicates with the oil reservoir 30. As illustrated, branch conduits 74a and 74b extend from chambers 76a and 76b, respectively, the chambers 76a and 76b being formed or otherwise defined in the casing 12 axially-adjacent the outer seal rings 18a and 18b. The branch conduits 74a and 74b combine to form the oil drain conduit 74 which feeds used oil from the casing 12 into the oil reservoir 30. A balance conduit 80 fluidly connects the area defined between the labyrinth seals 52a and 54a on one side of the impellers 16 with the area defined between the labyrinth seals 52b and 54b on the opposing side. The balance conduit 80 balances the pressure of the working fluid in the interior of the casing 12 to maintain stability. As can be appreciated, however, additional balance conduits may be employed to provide additional pressure balancing.

Figure 2:
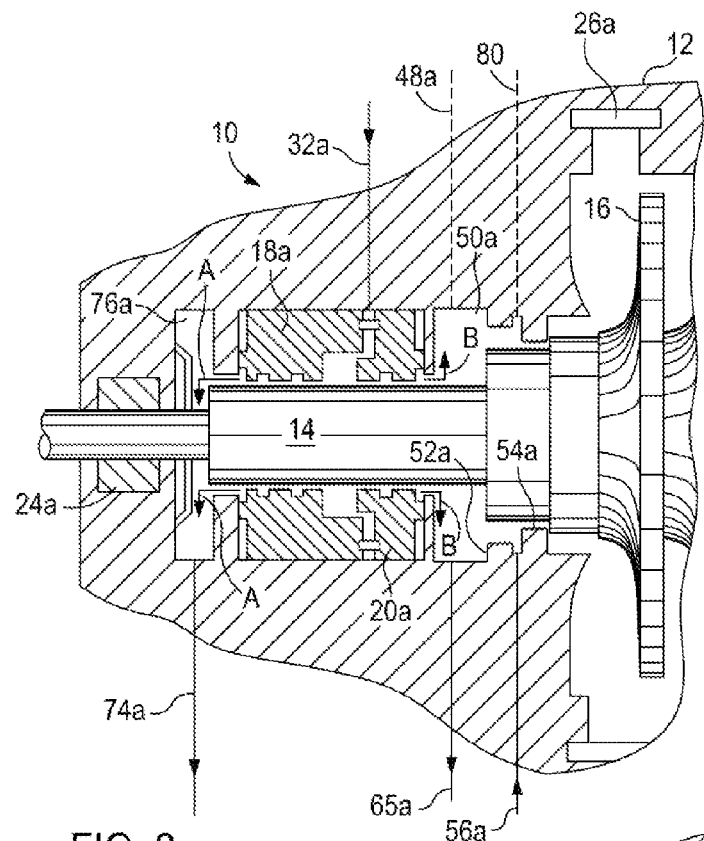
FIG. 2 is an enlarged, partial view of a portion of the embodiment of FIG. 1.

Referring now to FIG. 2, with continued reference to FIG. 1, illustrated is an enlarged, partial view of the rotating machine 10 and its associated components extending to the left of the impellers 16, as viewed in FIG. 1. It should be noted and understood by those skilled in the art that the operation of the opposing side of the rotating machine 10 (i.e., to the right of the impellers 16) and the corresponding components thereof may be generally identical, and therefore will not be described. In exemplary operation, the shaft 14 is driven in the manner described above to rotate the impellers 16 and draw the working fluid to be compressed into the rotating machine 10 via the inlet 26a. The working fluid is compressed by the series or stages of impellers 16 before being discharged from the casing 12 via the outlet 26b.

Oil from the reservoir 30 is pumped into the conduit 32a and eventually to the opening or gap defined between the seal rings 18a and 20a. As the oil enters the casing 12, it mixes with some of the process gases leaking across the gap or clearance formed between the outer surface of the shaft 14 and the inner surface of the seal ring 20a, thereby generating an oil and gas mixture, or sour oil. The pressure of the incoming oil from conduit 32a forces the oil and gas mixture in the clearance to migrate in opposing directions along the length of the shaft 14, as indicated by arrows A and B. The oil and gas mixture migrating in the direction of arrows A ultimately enters the chamber 76a and is then redirected to the oil reservoir 30 via conduit 74a for recycling.

The oil and gas mixture migrating in the direction of arrows B ultimately passes into the port 50a. The blower 58a is actuated to draw or otherwise flow the oil and gas mixture from the port 50a, via the first port conduit 65a, and into the first trap 60a, which substantially separates the oil from the gas. The separated gas is channeled through the first demister 64a (FIG. 1), the first conduit 56a, and back into the port 50a via the area defined between the labyrinth seals 52a and 54a.

Accordingly, the blower 58a facilitates a complete fluid circuit adapted to circulate process gas to and from the port 50a such that it is not required to vent the gas to a low pressure point or otherwise vent the gas to flare and damage the environment. Moreover, the blower 58a increases the pressure in the port 50a thereby generating a pressure differential across the labyrinth seals 52a and 54a that prevents any oil present in the interfaces between the shaft 14 and the rings 18a and 20a from migrating toward the impellers 16 and mixing with the working fluid.

Figure 4:
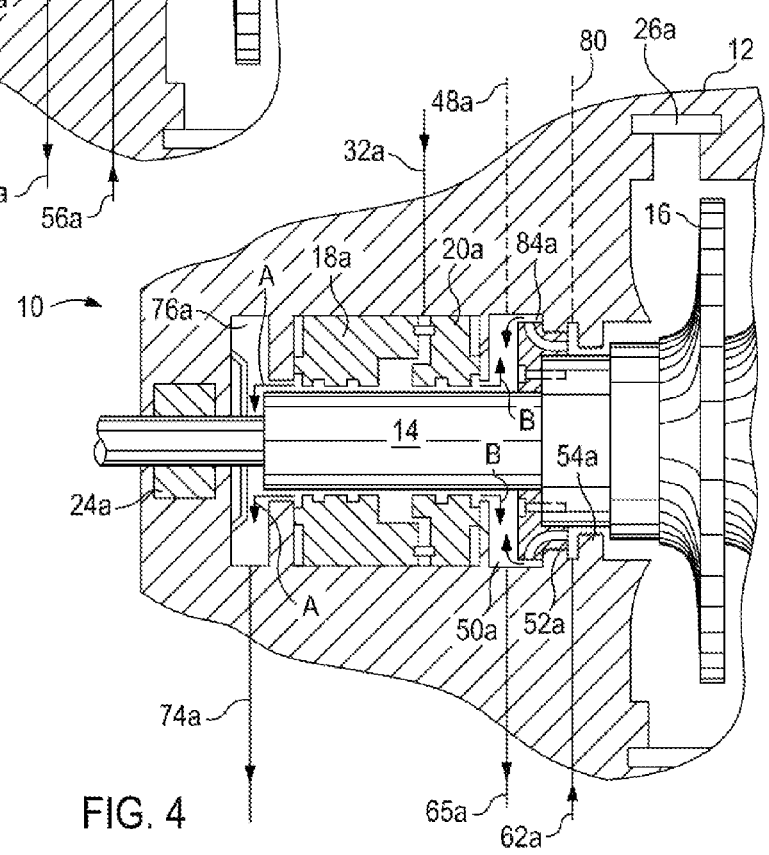
FIG. 4 is an enlarged, partial view of a portion of the embodiment of FIG. 3.
Figure 3:
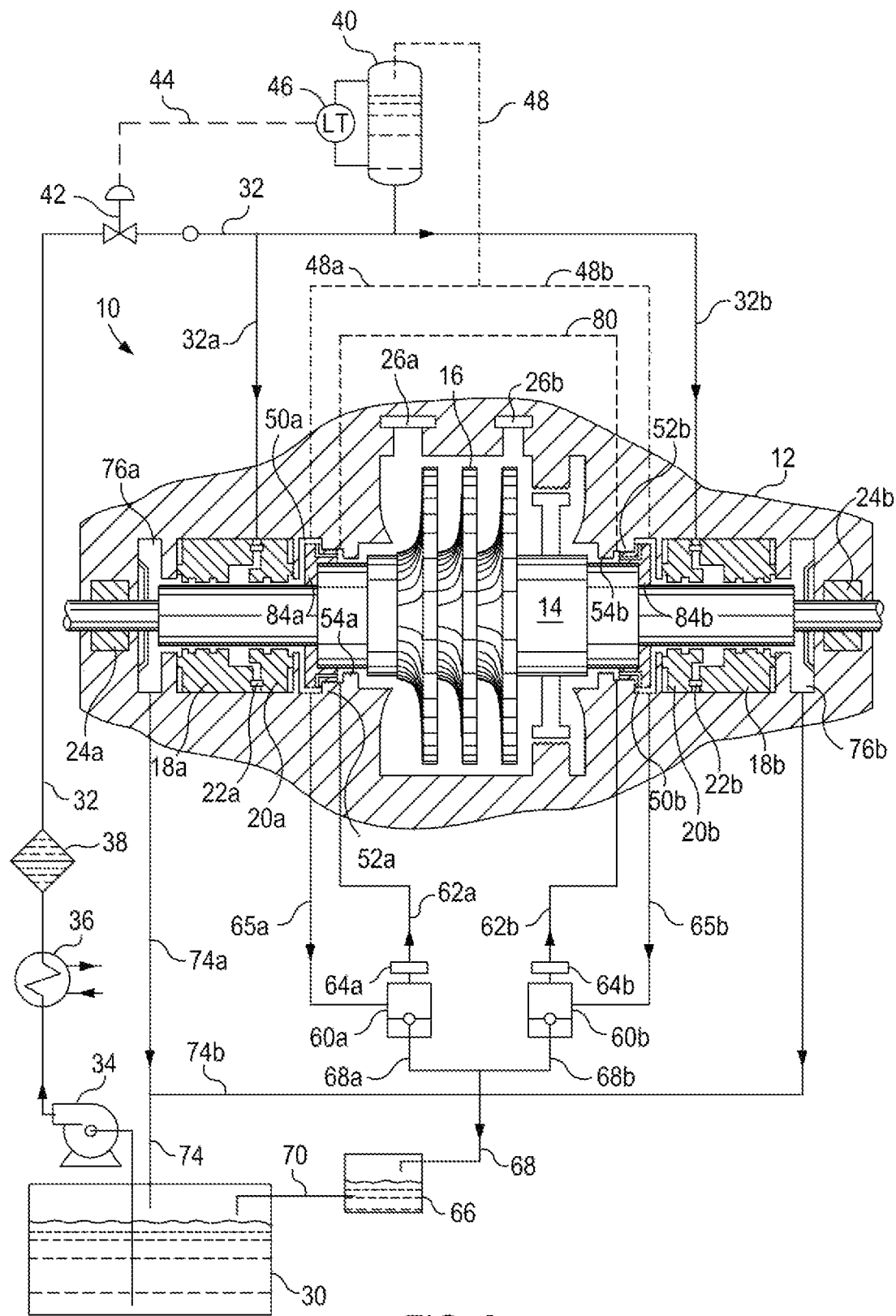
FIG. 3 is a partial cross-sectional, partial diagrammatic view of another embodiment of the disclosure, according to one or more embodiments disclosed.

Referring now to FIGS. 3 and 4, illustrated is another embodiment similar in some respects to the embodiments disclosed in FIGS. 1 and 2. Accordingly, the embodiments described with reference to FIGS. 3 and 4 may be best understood with reference to FIGS. 1 and 2, where like numerals indicate like components and therefore will not be described again in detail. As shown in FIGS. 3 and 4, the first and second blowers 58a and 58b and the first and second conduits 56a and 56b of FIGS. 1 and 2 are eliminated, and instead the first and second trap vent conduits 62a and 62b leading from the first and second traps 60a and 60b, respectively, are extended to the area defined between the labyrinth seals 52a and 54a and to the area between the labyrinth seals 52b and 54b, respectively.

First and second blowers 84a and 84b may be mounted on the shaft 14 for rotation therewith. In one or more embodiments, the first and second blowers 84a and 84b may be impellers, such as "micro" impellers. Each blower 84a and 84b may provide the pressure required to circulate the oil and gas mixture, much like the first and second blowers 58a and 58b as described above. Accordingly, rotation of the shaft 14 causes the corresponding rotation of each blower 84a and 84b, thereby discharging gas into the ports 50a and 50b, respectively.

As illustrated in FIG. 4, the oil and gas mixture in the port 50a may be channeled through the conduit 65a and into the first trap 60a for separation of the gas from the oil. From the first trap 60a, the separated gas may be recirculated back to the blower 84a by passing through the first demister 64a arranged in the conduit 62a. As with previous described embodiments, it is understood that the operation of the opposing side of the rotating machine 10 (i.e., to the right of the impellers 16) and corresponding components may be generally identical, and therefore need not be described again in detail.

It will be appreciated that the embodiments disclosed herein eliminate the need for the oil and/or gas derived from the first and second traps 60a and 60b to be vented to a low pressure point and/or piped to a flare which could damage the environment. Instead, the substantially separated gas following the traps 60a and 60b may be recirculated back into the casing 12 to not only reduce or eliminate the emission of gas as encountered in conventional oil seals, but also reduce or eliminate the migration of seal oil to the process side of the rotating machine 10 (e.g., into the impellers 16) via the gap defined between the outer surface of the shaft 14 and the labyrinth seals 52a and 54a or 52b and 54b. Consequently, relatively large losses of oil and/or gas are minimized, and process pollution to the environment via flaring is eliminated.

Figure 5:
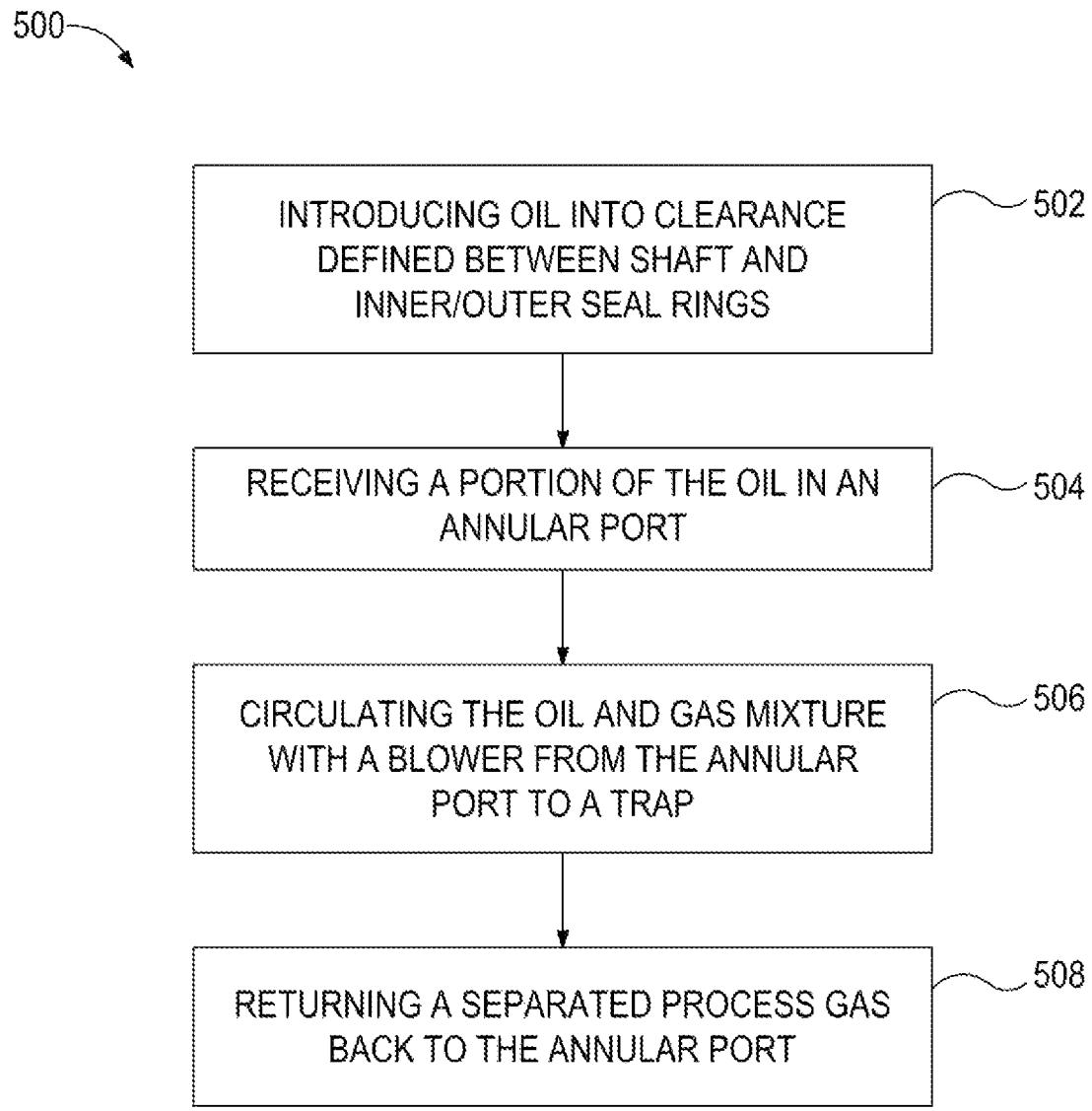
FIG. 5 is a flowchart of a method for sealing a rotatable shaft, according to one or more embodiments disclosed.

Referring now to FIG. 5, illustrated is a flowchart of a method 500 for sealing a rotatable shaft in a rotating machine. In one embodiment, the rotating machine may include a centrifugal compressor. The method 500 may include introducing oil into a clearance defined between an outer surface of the rotatable shaft and outer and inner seal rings, as at 502. The outer and inner seal rings may provide an oil film seal and be arranged within a casing of the rotating machine and axially-spaced from each other along the rotatable shaft. A portion of the oil introduced to the clearance may be received at an annular port, as at 504. The annular port may be defined in the casing between the inner seal ring and an outer labyrinth seal, where the outer labyrinth seal is axially-spaced from the inner seal ring. In the annular port, the portion of the oil introduced to the clearance mixes with process gas to generate an oil and gas mixture.

The method 500 may further include circulating the oil and gas mixture with a blower from the annular port to a trap, as at 506. In one embodiment, the blower is a hyperbaric fan arranged outside of the casing and in fluid communication with the annular port. In another embodiment, the blower is an impeller mounted to the shaft for rotation therewith. The blower may be configured to pressurize the annular port such that oil is prevented from traversing a gap formed between the outer labyrinth seal and the outer surface of the shaft. In the trap, the oil may be separated from the process gas, thereby generating a separated process gas, and the oil separated from the process gas may be recycled back to an oil reservoir for recirculation into the clearance. The separated process gas may then be returned back to the annular port, as at 508.

In each of the above embodiments, spatial references, such as "right", "left", "between", "outer", "inner", "surrounding", etc., are for the purpose of illustration only and do not limit the specific orientation or location of the layers described above. Also, the expression "conduit" is meant to include pipes, lines, tubes, hoses, and any other device that conveys fluid.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A shaft sealing system for a rotating machine, comprising:
    an outer seal ring axially-spaced from an inner seal ring along a shaft arranged for rotation in a casing of the rotating machine, the outer and inner seal rings being radially-offset from an outer surface of the shaft to define a clearance between the seals and the shaft;
    an oil reservoir and a pump configured to introduce oil from the oil reservoir to the clearance;
    an annular port defined in the casing between the inner seal ring and an outer labyrinth seal, the annular port being adapted to receive a portion of the oil introduced to the clearance, which mixes with process gas to generate an oil and gas mixture; and
    a blower configured to circulate the oil and gas mixture from the annular port to a trap, and return a separated process gas back to the annular port.

2. The shaft sealing system of claim 1, wherein the trap separates the oil from the process gas, and the oil separated from the process gas is recycled to the oil reservoir.

3. The shaft sealing system of claim 2, wherein the trap is arranged external to the casing.

4. The shaft sealing system of claim 1, further comprising a demister in fluid communication with the annular port and the trap, wherein the separated process gas is directed through the demister prior to returning to the annular port.

5. The shaft sealing system of claim 1, wherein the blower includes a hyperbaric fan disposed external to the casing and fluidly coupled to the annular port.

6. The shaft sealing system of claim 5, wherein the hyperbaric fan is driven by a micro expander.

7. The shaft sealing system of claim 1, wherein the blower is an impeller mounted on the shaft for rotation therewith, such that rotation of the shaft pressurizes the annular port.

8. A method for sealing a rotatable shaft in a rotating machine, comprising:
    introducing oil into a clearance defined between an outer surface of the rotatable shaft and outer and inner seal rings arranged within a casing of the rotating machine, the outer and inner seal rings being axially-spaced from each other along the rotatable shaft;
    receiving a portion of the oil introduced to the clearance at an annular port defined in the casing between the inner seal ring and an outer labyrinth seal axially-spaced from the inner seal ring, wherein the portion of the oil introduced to the clearance mixes with process gas to generate an oil and gas mixture;
    circulating the oil and gas mixture with a blower from the annular port to a trap; and
    returning a separated process gas back to the annular port.

9. The method of claim 8, further comprising:
    separating the oil from the process gas in the trap to generate the separated process gas; and
    directing the oil separated from the process gas to an oil reservoir to be recycled into the rotating machine.

10. The method of claim 9, further comprising directing the separated process gas through a demister prior to returning to the annular port.

11. The method of claim 8, further comprising pressurizing the annular port with the blower such that oil is substantially prevented from traversing a gap formed between the outer labyrinth seal and the outer surface of the shaft.

12. The method of claim 11, wherein the blower is a hyperbaric fan.

13. The method of claim 11, wherein the blower is an impeller mounted on the shaft for rotation therewith.

14. A compressor, comprising:
    a rotatable shaft arranged for rotation within a casing;
    an oil film seal arranged about the rotatable shaft and radially-offset from an outer surface of the rotatable shaft to define a clearance between the seal and the rotatable shaft;
    an oil reservoir and a pump in fluid communication with the clearance, the pump being configured to provide oil to the clearance, wherein a first portion of the oil introduced into the clearance is received within a chamber that is axially-adjacent a first side of the oil film seal;
    an annular port defined in the casing between the oil film seal and an outer labyrinth seal, the annular port receiving a second portion of the oil introduced to the clearance, wherein the second portion mixes with a process gas to generate an oil and gas mixture;

a blower in fluid communication with the annular port and configured to draw the oil and gas mixture from the annular port and return a separated process gas back to the annular port; and a trap fluidly coupled to the annular port and blower, the trap being configured to receive the oil and gas mixture and separate the oil from the process gas, wherein the oil separated from the process gas is recycled to the oil reservoir and the process gas separated from the oil is the separated process gas.

15. The compressor of claim 14, wherein the chamber is in fluid communication with the oil reservoir.

16. The compressor of claim 14, further comprising an inner labyrinth seal disposed about the rotatable shaft and axially-adjacent the outer labyrinth seal, wherein the separated process gas is reintroduced to the annular port via a conduit defined in the casing between the inner and outer labyrinth seals.

17. The compressor of claim 16, wherein the blower pressurizes the annular port such that oil is prevented from traversing a gap formed between the outer surface of the shaft and the inner and outer labyrinth seals.

18. The compressor of claim 14, further comprising a tank in fluid communication with the clearance and the oil reservoir, the tank being configured to maintain an overpressure of oil in the clearance.

19. The compressor of claim 14, further comprising a demister configured to receive the separated process gas prior to returning to the annular port.

20. The compressor of claim 14, further comprising a degassing tank fluidly coupled to the trap and the oil reservoir.

* * * * *